United States Patent
Shaw et al.

(10) Patent No.: US 9,355,073 B2
(45) Date of Patent: May 31, 2016

(54) CONTENT ATTRIBUTE CONTROL INTERFACE INCLUDING INCREMENTAL, DIRECT ENTRY, AND SCROLLABLE CONTROLS

(71) Applicant: Microsoft Technology Licensing, LLC, Redmond, WA (US)

(72) Inventors: Han-Yi Shaw, Redmond, WA (US); Allen Ussher, Seattle, WA (US); Michael Schreiber, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/920,763

(22) Filed: Jun. 18, 2013

(65) Prior Publication Data
US 2014/0372949 A1     Dec. 18, 2014

(51) Int. Cl.
G06F 17/21      (2006.01)
G06F 3/0482     (2013.01)
G06F 3/0485     (2013.01)
G06F 3/0488     (2013.01)
G06F 3/0484     (2013.01)

(52) U.S. Cl.
CPC ............ *G06F 17/211* (2013.01); *G06F 3/0482* (2013.01); *G06F 3/0485* (2013.01); *G06F 3/0488* (2013.01); *G06F 3/04847* (2013.01)

(58) Field of Classification Search
None
See application file for complete search history.

(56) References Cited

U.S. PATENT DOCUMENTS

| | | | |
|---|---|---|---|
| 7,117,450 B1 | 10/2006 | Chaudhri | |
| 7,432,928 B2 * | 10/2008 | Shaw et al. | 345/473 |
| 7,479,949 B2 | 1/2009 | Jobs et al. | |
| 7,627,517 B2 * | 12/2009 | Badenhorst et al. | 705/37 |
| 7,853,877 B2 | 12/2010 | Giesen et al. | |
| 8,457,691 B2 * | 6/2013 | Brinda et al. | 455/566 |
| 8,689,137 B2 * | 4/2014 | McCormack et al. | 715/810 |
| 2007/0055943 A1 * | 3/2007 | McCormack et al. | 715/746 |
| 2013/0019204 A1 | 1/2013 | Kotler et al. | |

OTHER PUBLICATIONS

Soprotec, Word Basics User Guide—Modular Support for Word 2010, Dec. 2010.*
TechRadar, Windown Phone 7: a guide for new users, Feb. 2011.*
IOSCreator, Display Popovers on the iPad, May 2013.*
Nutting et al, Beginning iPad Development for iPad Developers, Springer, 2010.*
CComboBox Class, Visual Studio 2005, Published 2005.*
Multiple-Item Controls: Working with LiSTBox and ComboBox Controls, Visual Studio 2008, Published 2008.*

(Continued)

*Primary Examiner* — Paul F Payer
(74) *Attorney, Agent, or Firm* — Tom Wong; Julie Kane Akhter; Micky Minhas

(57) ABSTRACT

Embodiments provide content attribute adjustment controls that enable the use of a variety of input types when adjusting content attributes such as font sizes, but the embodiments are not so limited. In an embodiment, a computer-based method uses a font size control interface that is configured to accept a variety of input types to adjust font sizes. A handheld device of an embodiment includes at least one application that uses a font size control interface configured with first and second incremental controls, a direct entry control, and/or a scrollable control. Computer storage of an embodiment includes executable instructions that operate to display a font size control interface that accepts inputs via one or more of first and second incremental controls, a direct entry control, and/ or a scrollable control. Other embodiments are included.

20 Claims, 7 Drawing Sheets

(56) References Cited

OTHER PUBLICATIONS

ListBox—Automatically scroll CurrentItem into View, MichIG's Blog, 2010.*
"BlackBerry 10-UI Guidelines", Published on: Mar. 18, 2013,Available at: http://developer.blackberry.com/devzone/files/design/bb10/UI_Guidelines_BlackBerry_10.pdf, 97 pages.
"Week Calendar Awesome Features", Retrieved on: Apr. 23, 2013, Available at: http://www.weekcal.com/features.html, 5 pages.
Sarur, "Chronos Calendar—When you are Tired of Tron on your Windows Phone", Published on: Dec. 31, 2012, Available at: http://wmpoweruser.com/chronos-calendarwhen-you-are-tired-of-tron-on-your-windows-phone/, 5 pages.
"What's New for Outlook 2013 Developers", Published on: Mar. 5, 2013, Available at: http://msdn.microsoft.com/en-us/library/office/jj229830.aspx, 31 pages.
Ambale, et al., "The Latest E-Business Suite R12.x OA Framework Rich User Interface Enhancements", Retrieved on: Apr. 23, 2013, Available at: http://www.oracle.com/technetwork/apps-tech/oafrichuserinterfaceenhancements-309179.pdf, 48 pages.
Neuburg, Matt, "Chapter 22. Popovers and Split Views", In Book—Programming iOS 6, 3rd Edition, Feb. 2013, 14 pages.
"UIPopoverController Class Reference", Retrieved on: Apr. 25, 2013, Available at: http://developer.apple.com/library/ios/#documentation/uikit/reference/UIPopoverController_class/Reference/Reference.html, 11 pages.
International Search Report and Written Opinion for PCT/US2014/041088 mailed Sep. 17, 2014.
Knowlton, G., "Using the new Office with Touch: Office Blogs," http://blogs.office.com/2012/07/18/using-the-new-office-with-touch/, 33 pages (Jul. 18, 2012).
Microsoft: "Font size control in MS Word 2010 (screen shot)," http://www.microsoft.com, 2 pages (Jun. 15, 2010).

* cited by examiner

CONTENT ATTRIBUTE CONTROL INTERFACE INCLUDING INCREMENTAL, DIRECT ENTRY, AND SCROLLABLE CONTROLS

BACKGROUND

Consumers have numerous handheld computing devices available for purchase, such as laptops, tablets, and smartphones for example. Application developers attempt to account for the wide variety of available device configurations and input types when developing useable application controls. One challenging area concerns managing textual attributes, such as font sizes for example, in conjunction with the plurality of input types available to the end-user. For example, use of a drop-down menu of preset font size values may not be a natural way of allowing users to adjust font sizes using touch, gestures, or other touch-based inputs. As such, application developers may need to consider touch-based input paradigms when developing application controls.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide content attribute adjustment controls that enable the use of a variety of input types when adjusting content attributes such as font sizes, but the embodiments are not so limited. In an embodiment, a computer-based method uses a font size control interface that is configured to accept a variety of input types to adjust font sizes. A handheld device of an embodiment includes at least one application that uses a font size control interface configured with first and second incremental controls, a direct entry control, and/or a scrollable control. Computer storage of an embodiment includes executable instructions that operate to display a font size control interface that accepts inputs via one or more of first and second incremental controls, a direct entry control, and/or a scrollable control. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
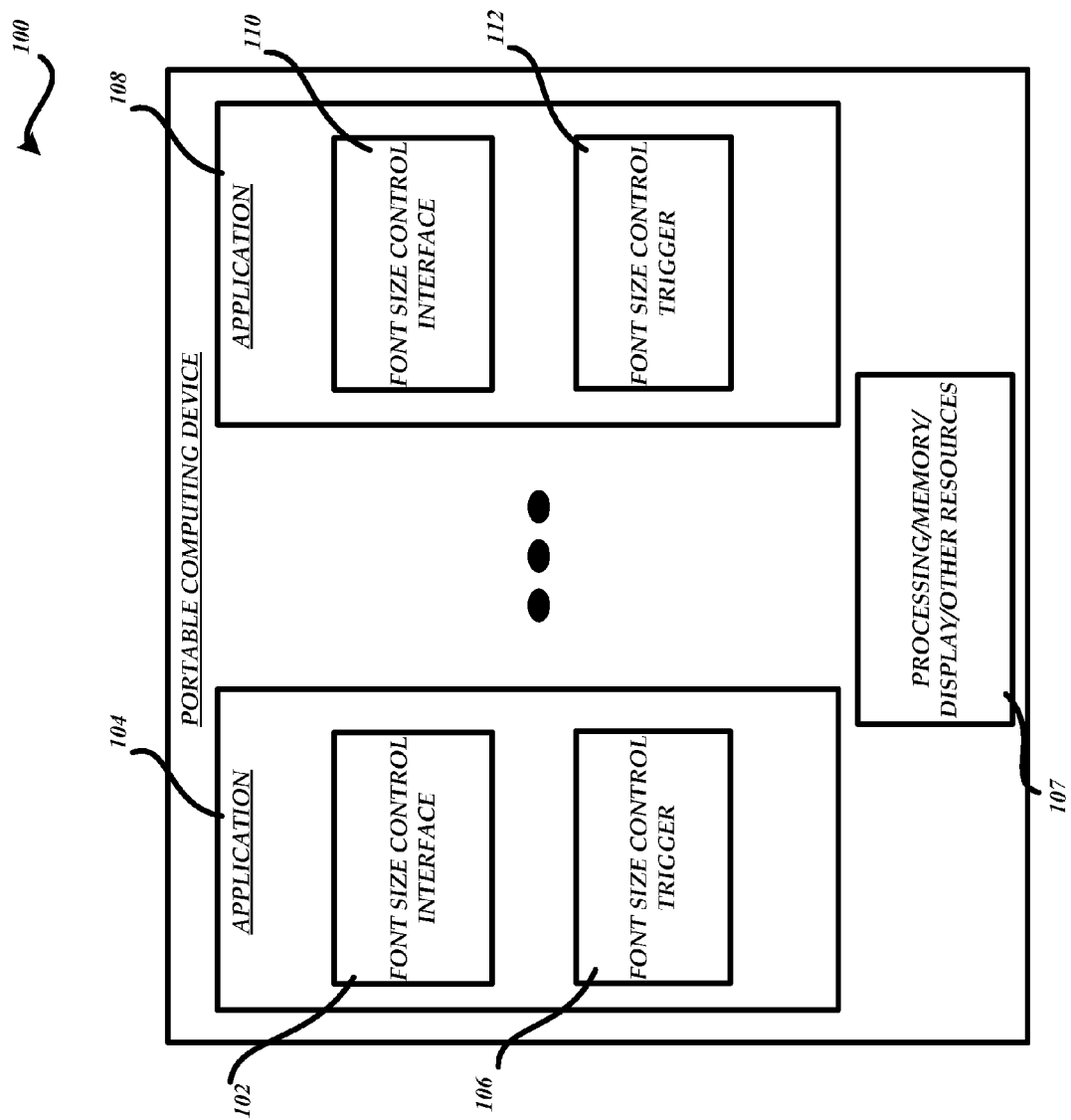
FIG. 1 is a block diagram of an exemplary portable computing device configured with context attribute control features.

FIG. 1 is a block diagram of an exemplary portable or handheld computing device 100, such as a laptop, tablet, mobile or smart phone, and the like, that includes one or more applications that use a font size control interface configured to respond to a variety of input types available to a user with which to change a font size of designated text. As shown in example of FIG. 1, a font size control interface 102 is included with application 104. As described below, the font size control interface 102 of an embodiment is displayed in response to actuation of a font size control trigger or trigger 106. As will be appreciated, the handheld computing device 100 is configured to store multiple user applications and includes processing, memory, display, and/or other resources (shown collectively as 107).

Depending on the particular implementation, the font size control interface 102 and the associated functionality can be included as part of each application that offers the adjustment of font size or implemented as a separate component and accessed by each application when triggered. As shown, the exemplary handheld computing device 100 includes a plurality of applications illustrated by the ellipses displayed between application 104 and application 108. For the example of FIG. 1, application 108 also includes a font size control interface 110 and an associated trigger 112.

As an illustrative example, the font size control interface 102 can be implemented as part of a word processing application to control adjustment of font sizes as part of editing a word processing document, wherein the font size control interface 102 is displayed in response to activation or actuation of the trigger 106. In one embodiment, the trigger 106 is displayed as part of a ribbon or other application menu and configured to receive user input (e.g., tap, click, etc.) to trigger display of the font size control interface 102. For example, a user can touch or hover over the font size control trigger 106 to cause code or instructions to execute and display the font size control interface 102.

The font size control interface 102 can be implemented as part of any application that allows manipulation of font size using a variety of available input types. For example, the font size control interface 102 can be included as an integrated or add-in control for a word processing application, spreadsheet application, drawing application, presentation application, or other application that allows manipulation of font size. Depending on the input types available for each particular computing device, the font size control interface 102 can be triggered for display and receive user input to one or more displayed control portions of the font size control interface 102.

Figure 3:
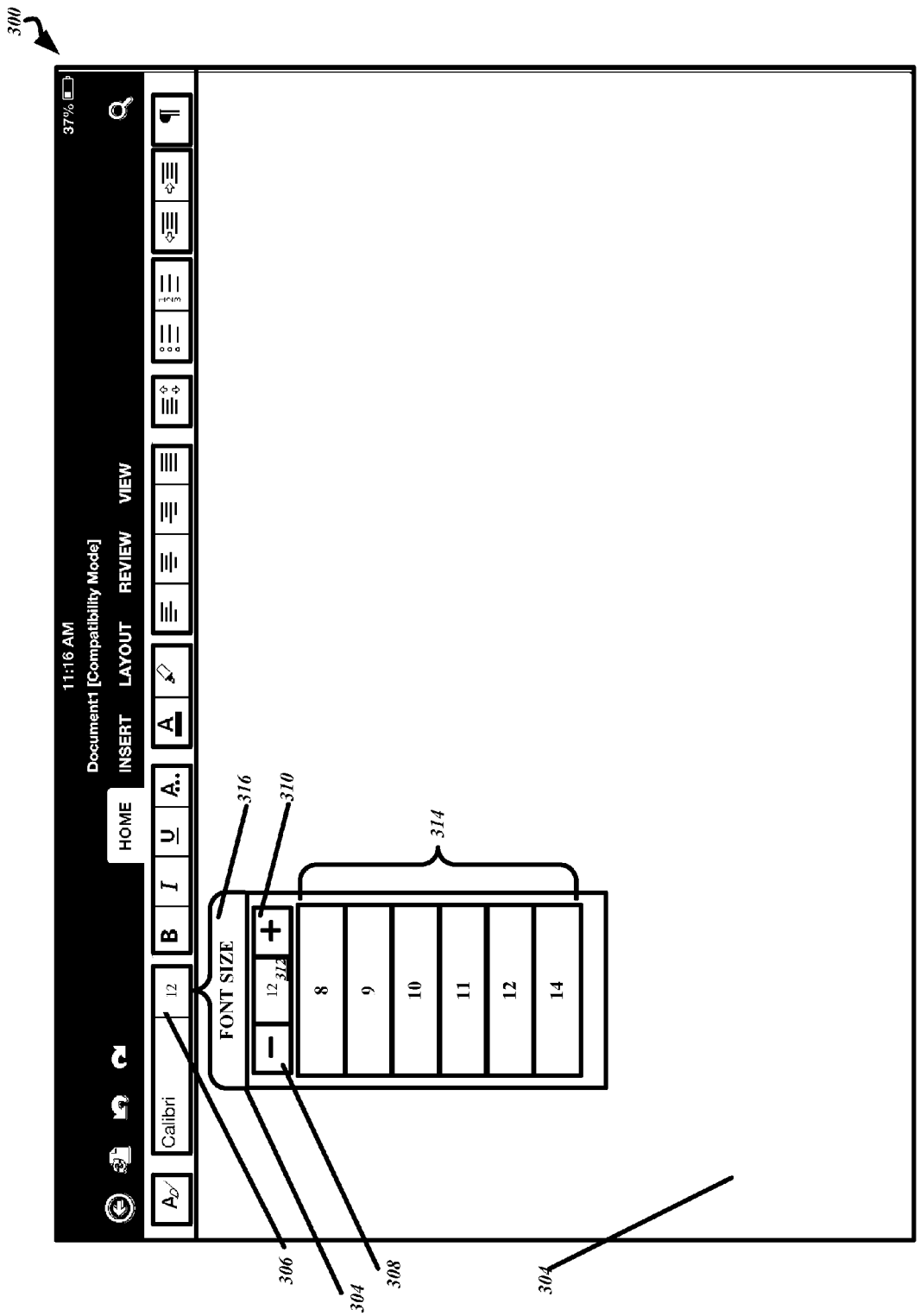
FIG. 3 depicts an exemplary handheld computing device configured with font size control features.

The font size control interface 102 of an embodiment is displayed as a single integrated interface or overlay (also referred to as a popover control) and configured with multiple font size control portions that accept a variety of input types including first and second incremental controls, a direct entry control, and/or a scrollable control (see FIG. 3 for example). The first and second incremental controls of the font size control interface 102 can be used to incrementally increase or decrease the font size of a selection using tap inputs, click inputs, and/or other input types. The direct entry control of the font size control interface 102 enables users to change the font size by inputting a desired font size directly into an entry area of the direct entry control. The scrollable control of the font size control interface 102 enables users to scroll through and/or select a number of font sizes displayed with the scrollable control.

The font size control interface 102 of one embodiment is configured as a popover interface or overlay that, when activated in response to user interaction with the trigger 106, simultaneously displays a plurality of font size control options or modalities above or otherwise disposed in relation to an application UI that utilizes the font size control interface 102. For example, a ribbon control or ribbon button can be configured as a font size control trigger that operates in response to user input such as a tap, hover, etc., to trigger display of the font size control interface 102 directly below the ribbon button. Once displayed, a user has a variety of input modalities available to change the font size when using the font size control interface 102.

The font size control interface 102 can be configured with programming code or instructions that operate in response to use of the trigger 106 to simultaneously display the first incremental control that operates to incrementally increase the font size, the second incremental control that operates to incrementally decrease the font size, the direct entry control, and the scrollable control. In an embodiment, the scrollable control is disposed below or otherwise in relation to the first and second incremental adjustment controls and direct entry control. The scrollable control of one embodiment is configured as an upright rectangle that includes a plurality of scrollable and selectable font sizes.

The scrollable control of one embodiment is configured to receive touch-based inputs (e.g., swipes, taps, flicks, etc.) or other types of inputs to scroll through and/or choose from a plurality of font sizes displayed as part of the scrollable control (see FIG. 3 for example). Other available font sizes can be hidden from view until a user scrolls to or beyond the top or bottom of displayed font sizes with the scrollable control. A bounce back effect can be used to notify the user of the end or beginning of the list of font sizes.

The direct entry control of one embodiment enables a user to directly enter a font size into a defined entry area of the direct entry control using soft keys, hard keys, or some other input means. According to one embodiment, the integrated controls of the font size control interface 102 are sized and configured for touch-based inputs. However, other types of inputs can be used to interact with the font size control interface 102 including mouse-based, gesture-based, vocalized, etc.

According to one embodiment of the font size control interface 102, the first and second incremental controls are configured to have substantially the same size and are disposed as hit targets on either side of the direct entry control. However, the incremental controls and/or other font size controls can be disposed in other configurations. For example, the incremental controls can be configured adjacent to one another or positioned above/below the direct entry control. In an embodiment, the first incremental control is configured as a plus or addition sign ("+") and positioned to the right of the direct entry control and the second incremental control is configured as a minus or subtraction sign ("−") and positioned to the left of the direct entry control. As an example, each tap on the first incremental control operates to increase the font size by one, whereas each tap on the second incremental control operates to decrease the font size by one. In another configuration, a greater than sign (">") and a less than sign ("<") can be used as hit targets for the first and second incremental controls.

Prolonged touch (e.g., greater than 1 second) or holding of one of the incremental controls operates to increase the speed of incrementing through font values displayed in the direct entry control. The direct entry control provides multiple utilities by being configured to accept user input directly to change the font size while also reflecting use of the incremental controls and/or scrollable control by displaying different font sizes as the respective controls are used. As described above, the exemplary handheld computing device 100 can include a plurality of application types that utilize aspects of a font size control interface. For example, the handheld computing device 100 can be representative of tablet computer or smartphone that enables users to selectively use different types of installed applications or "apps." The ellipses are shown to illustrate the multiple applications available to the user of the handheld computing device 100.

The client devices/systems described herein can be configured with at least one processor, system memory, networking, display, and/or other components. System memory can include volatile (e.g. random access memory (RAM)), non-volatile (e.g. read-only memory (ROM)), flash memory, etc. System memory can include an operating system and various application programs that can be used by an end-user. It will be appreciated that embodiments described herein may also be practiced in conjunction with other operating systems, device/system types, and/or other application programs.

Various embodiments can be used with a number of computer configurations, including hand-held devices, multiprocessor systems, microprocessor-based or programmable consumer electronics, minicomputers, mainframe computers, etc. Various embodiments can be implemented in distributed computing environments using remote processing devices/systems that communicate over a one or more communications networks. In a distributed computing environment, program modules or code may be located in both local and remote memory. In a system-on-a-chip (SOC) architecture, a central processing unit, a graphics processor, memory, USB controller, power management circuits, wireless radio(s) (WiFi, cellular, etc.), and/or other components can be used to provide application functionality. Various embodiments may be implemented as a process or method, a system, a device, or computer storage or computer readable storage for example.

Figure 2:
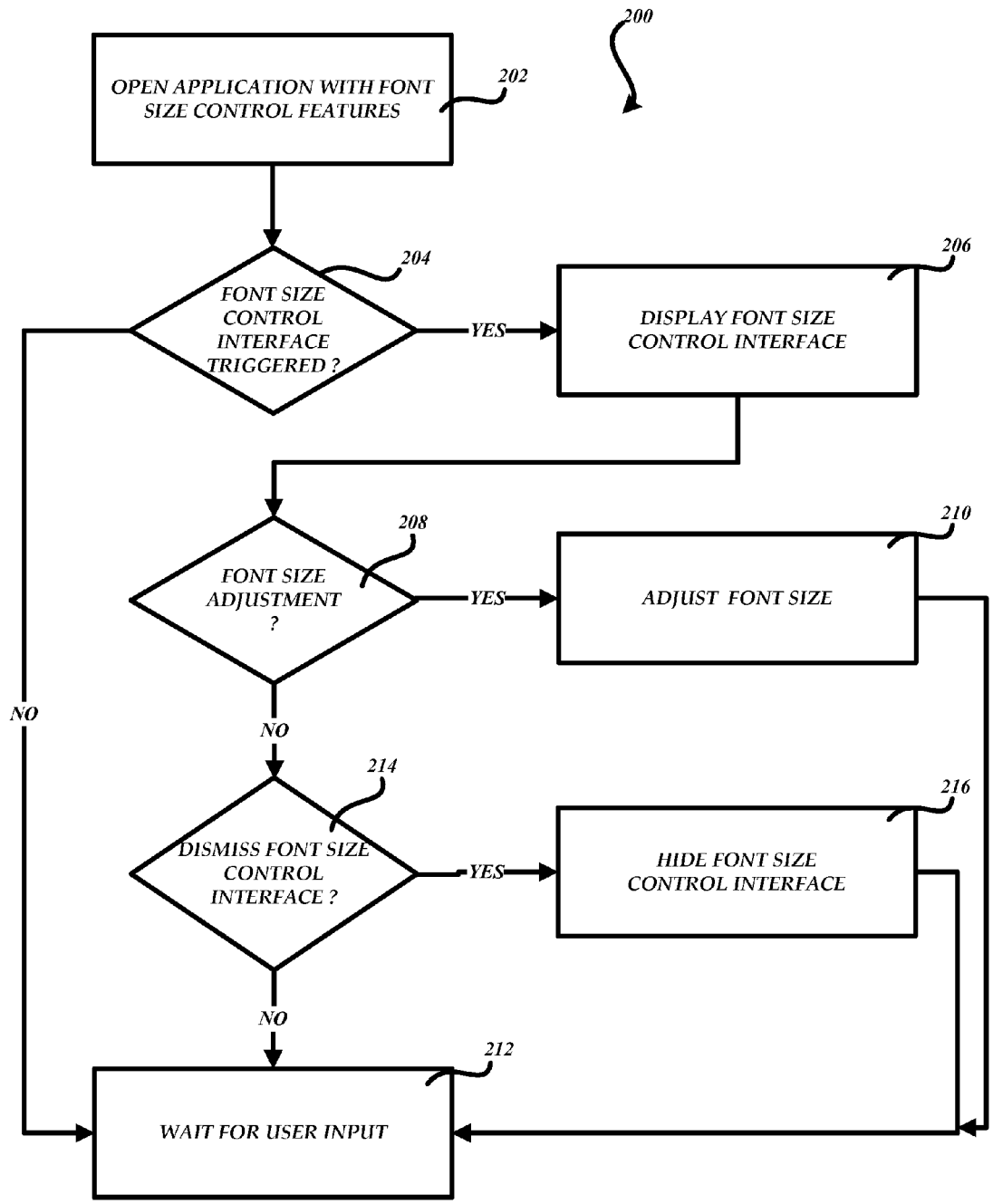
FIG. 2 is a flow diagram depicting an exemplary process of using a font size control interface that includes a plurality of input options available to adjust a font size.

FIG. 2 is a flow diagram depicting an exemplary process 200 of using a font size control interface that includes a plurality of input options available to adjust font sizes. At 202, the process 200 begins when a user uses a computing device/system and an application that uses a font size control interface that include a plurality of simultaneous control options. For example, a word processing application, spreadsheet application, drawing or other application can use a font size control interface to adjust the font size of selected portions of text. If the font size control is triggered at 204, the process 200 continues to 206 and operates to display the font size control interface.

The font size control interface of an embodiment is configured with complex programming code to simultaneously display a plurality of font size controls in response to activation of a font size control trigger that operates to trigger display of the font size control interface. Once triggered, the font size control interface of one embodiment simultaneously displays first and second incremental controls, a direct entry control, and/or a scrollable control, wherein each control is configured to receive user input to adjust the font size according to modality preference.

If the user has used the font size control interface to adjust the font size at 208, the process 200 continues to 210 and adjusts the font size of associated text before proceeding to 212 and waiting for user input. For example, the process at 210 can adjust the font size in response to a user using one or more of the incremental controls to increment the font size in increments of one or scroll through font sizes displayed as part of the scrollable display. If the user has not used the font size control interface to adjust the font size at 208 and the font size control is to be hidden or dismissed at 214, the process 200 proceeds to 216 and hides the font size control interface from view until a subsequent triggering operation.

If the user has not used the font size control interface to adjust the font size at 208 and the font size control is not to be hidden at 214, the process 200 proceeds to 212 and waits for user input. For example, a time to hide threshold can be used to hide the font size control interface after some period of non-use. The font size control interface can also be hidden or dismissed in other ways, such as when a user hits the trigger a second time or taps on some other portion of the font size control interface other than the controls. Referring back to 204, if the font size control is not triggered, the process 200 proceeds to 212 and waits for user input. While a certain number and order of operations is described for the exemplary flow of FIG. 2, it will be appreciated that other numbers and/or orders can be used according to desired implementations.

FIG. 3 depicts an exemplary handheld computing device 300, such as a tablet computer (e.g., SURFACE device) or smart phone (e.g., WINDOWS phone) for example, that includes one or more user applications configured with font size control features. As shown in FIG. 3, an application 302 includes a font size control interface 304 that has been triggered in response to use of trigger 306. While trigger 306 is configured as a ribbon or menu command, it will be appreciated that the font size control interface 304 can be triggered for display by other means. Thus, when the user clicked or tapped on the trigger 306, such as the font size indicator in the ribbon for this example, the font size control interface 304 displays in relation to the trigger 306.

As shown by this example, the font size control interface 304 is included as part of the functionality of a word processing application and used to adjust font sizes as part of editing a word processing document. Depending on the implementation of trigger 306, a user can touch or hover over the trigger 306 to cause code or instructions to execute under processor control to display the font size control interface 304 relative to the trigger 306. In one embodiment, when activated, the font size control interface 304 is configured as a popover or overlay that floats below the trigger 306.

As shown in FIG. 3, and according an embodiment, the font size control interface 304 includes a plurality of font size control or adjustment portions that enable a user to adjust the font size using various input types, such as incremental inputs, direct entry inputs, and/or scroll/tap inputs. For this example implementation, each control is configured for touch-based inputs wherein the various font size controls are sized and configured to receive tap inputs.

The first incremental control 308 of one embodiment is configured as a fingertip sized control or button and displays a minus sign "−" to inform the user that the control is used to decrease the font size. The second incremental control 310 of such an embodiment is also configured as a fingertip sized control and displays a plus sign "+" to inform the user that the control is used to increase the font size. In one embodiment, a single tap on either of the first incremental control 308 or second incremental control 310 operates to adjust the font size by one. Prolonged touching or holding of either incremental control operates to increase the speed of incrementing through the available font sizes.

The direct entry control 312 enables a user to enter a value to be used for the font size directly in an entry area of the direct entry control 312. As long as the font size is valid, the user can enter a desired font size directly into the direct entry control 312 using keys of a keyboard or touch-based keyboard. The scrollable control 314 of the font size control interface 304 enables users to scroll through and/or select a number of font sizes displayed with the control. The scrollable control 314 is configured to receive touch-based inputs (e.g., swipes, taps, flicks, etc.) and/or other input types to scroll through and/or choose from a plurality of available font sizes. Other available font sizes can be hidden from view until a user scrolls to or beyond the top or bottom of displayed font sizes. In one embodiment, a bounce back effect can be used to notify the user of the end or beginning of a vertically disposed list of font sizes.

As shown by the example of FIG. 3, the first and second incremental controls 308, 310 are configured to have substantially the same size and configuration and are adjacently disposed as hit targets to the left and to the right of the direct entry control 312. However, the incremental controls and/or other font size controls can be disposed in other configurations. The direct entry control 312 is configured to accept user input directly to change the font size while also reflecting use of the incremental or scrollable controls by displaying different font sizes as the controls are used.

The scrollable control, shown collectively as 314, of one embodiment is configure to persistently display a range of selectable font sizes that a user may choose from to adjust the font size. For this example, the scrollable control 314 is adjacently positioned below the incremental and direct entry controls to display a finite number of selectable font sizes that the user may choose from, wherein a larger touchable area is used to display each selectable font size relative to the sizes of the incremental and/or direct entry controls. Other available font sizes are hidden until the user scrolls past an endpoint. In one embodiment, the displayed values with the scrollable control 314 dynamically adjust to reflect changes made to the font size via one or more of the incremental and/or direct entry controls. For example, if a user entered the value "16" in the direct entry control 312, the scrollable values would morph to a different range of available font sizes relative to the previously hidden value of 16.

The font size control interface 304 of an embodiment also includes a portion 316 that can be used to hide or dismiss the font size control interface 304. The font size control interface 304 can also be hidden if a user changes focus, selects another ribbon menu item, taps or clicks outside of the font size control interface 304, and the like. In one embodiment, and as shown in FIG. 3, the font size control interface 304 is substantially rectangular in shape, wherein a vertical dimension is greater than a horizontal dimension.

It will be appreciated that various features described herein can be implemented as part of a processor-driven computer environment including hardware and software components. Also, while certain embodiments and examples are described above for illustrative purposes, other embodiments are included and available, and the described embodiments should not be used to limit the claims. Suitable programming means include any means for directing a computer system or device to execute steps of a process or method, including for example, systems comprised of processing units and arithmetic-logic circuits coupled to computer memory, which systems have the capability of storing in computer memory, which computer memory includes electronic circuits configured to store data and program instructions or code.

An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations. The term computer readable media as used herein can include computer storage media or computer storage. The computer storage of an embodiment stores program code or instructions that operate to perform some function. Computer storage and computer storage media can include volatile and nonvolatile, removable and non-removable media implemented in any method or technology for storage of information, such as computer readable instructions, data structures, program modules, etc.

System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or other code. Exemplary components include an application, a server running the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Figure 4:
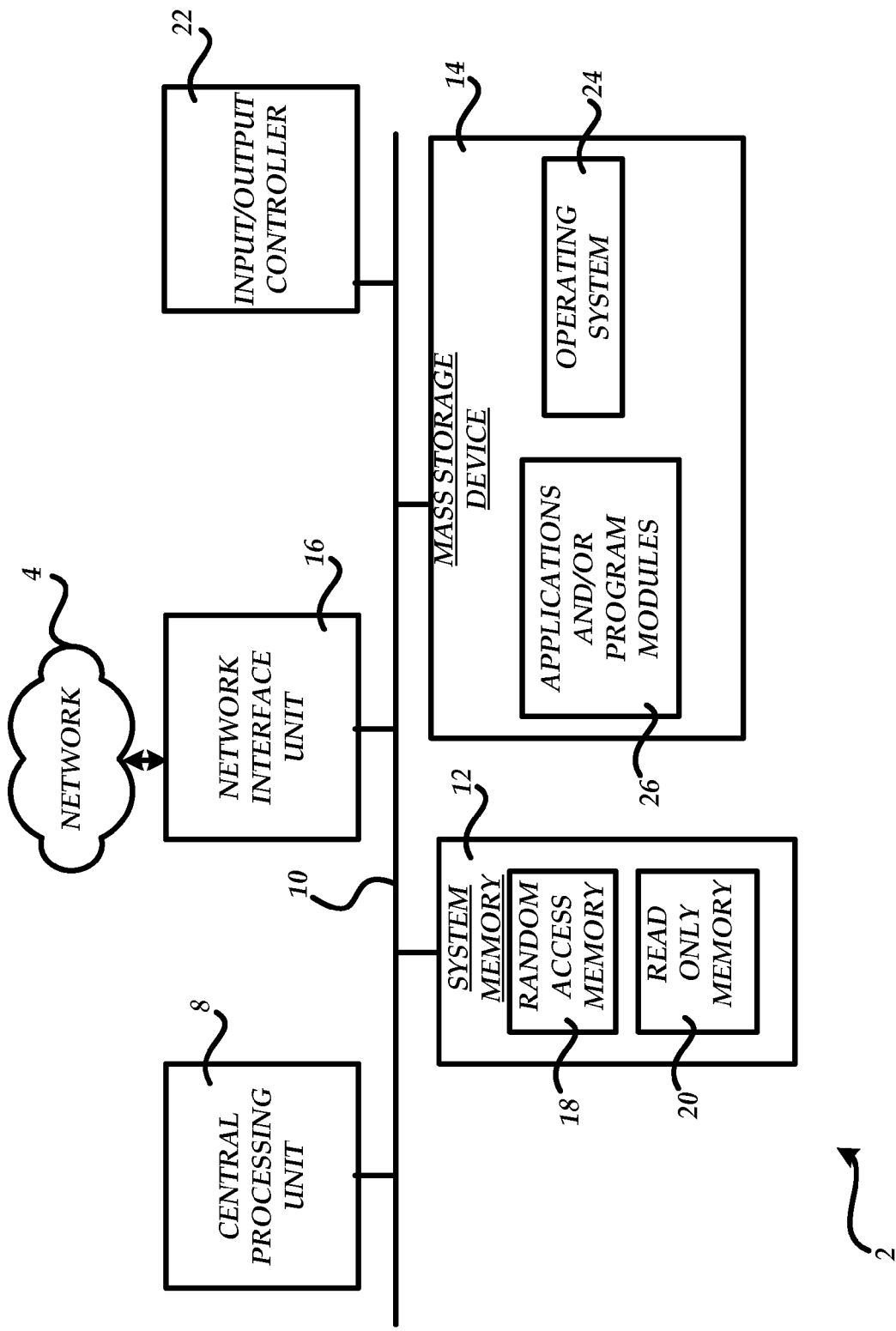
FIG. 4 is a block diagram illustrating an exemplary computing environment for implementation of various embodiments.

Referring now to FIG. 4, the following discussion is intended to provide a brief, general description of a suitable computing environment in which embodiments can be implemented. While described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 4, computer 2 comprises a general purpose server, desktop, laptop, handheld, or other type of computer capable of executing one or more application programs including applications that use font size control features or other application functionality. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

Figure 5A:
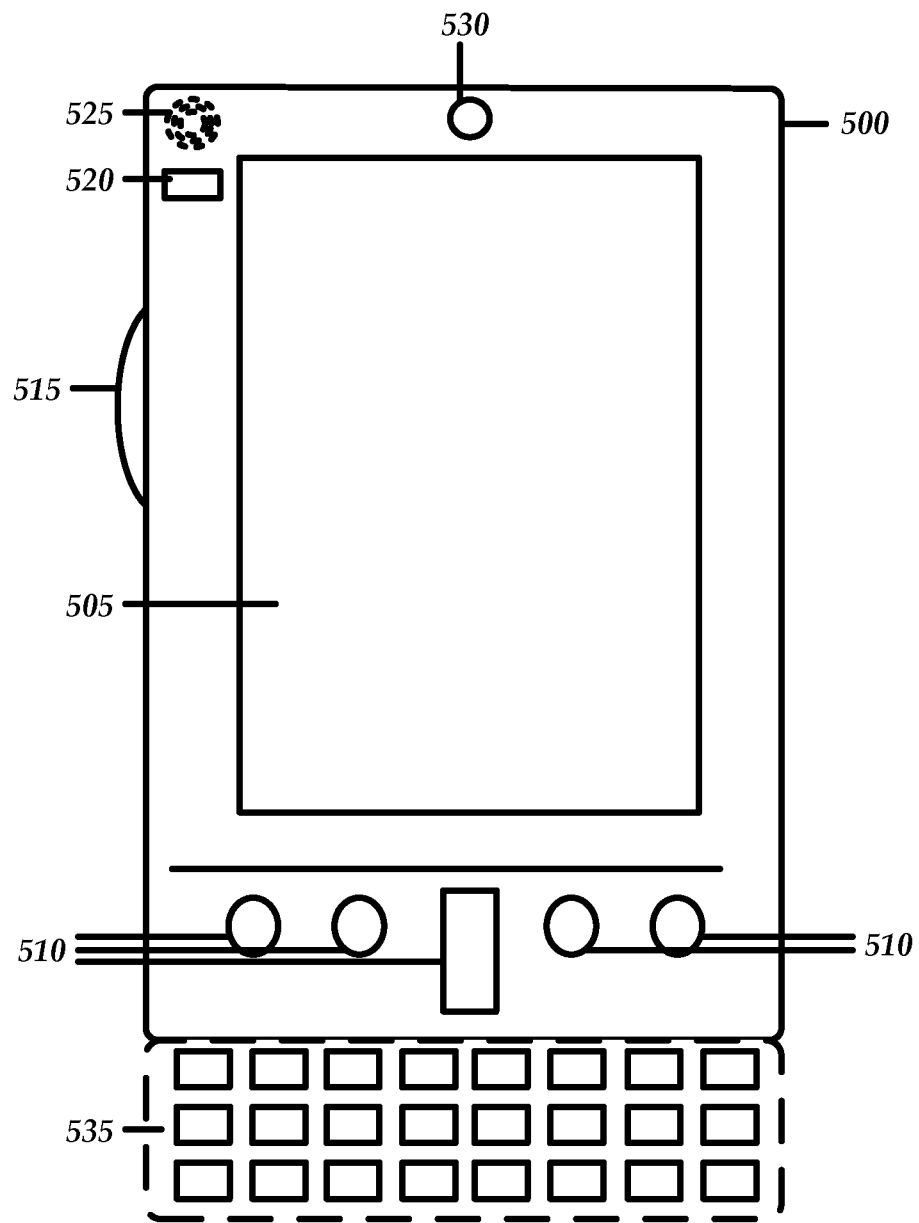
FIGS. 5A-5B illustrate a mobile computing device with which embodiments may be practiced.
Figure 5B:
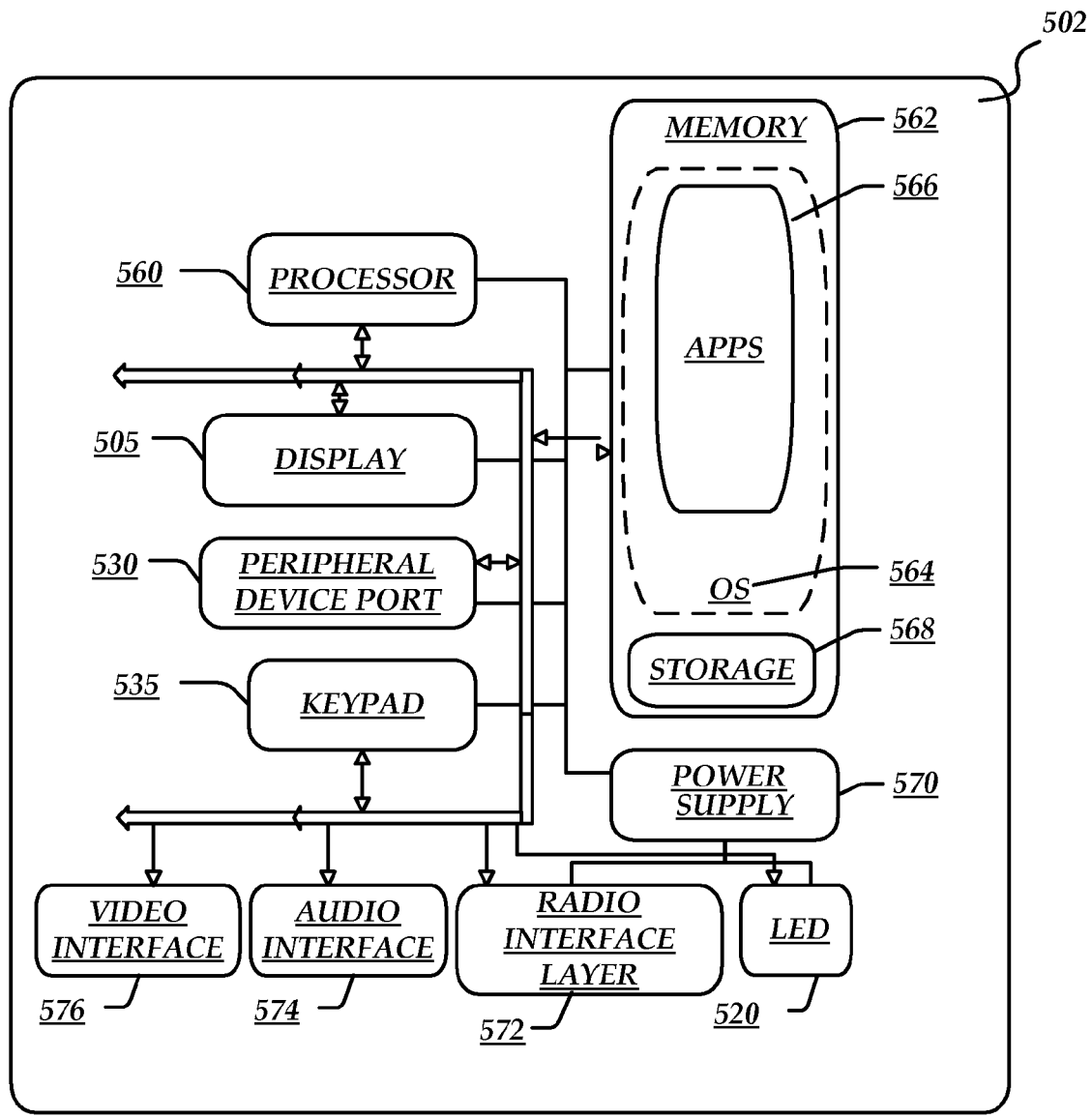

FIGS. 5A-5B illustrate a mobile computing device 500, for example, a mobile telephone, a smart phone, a tablet personal computer, a laptop computer, and the like, with which embodiments may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566, including application programs that utilize a font size control interface, may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 566 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device.

The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
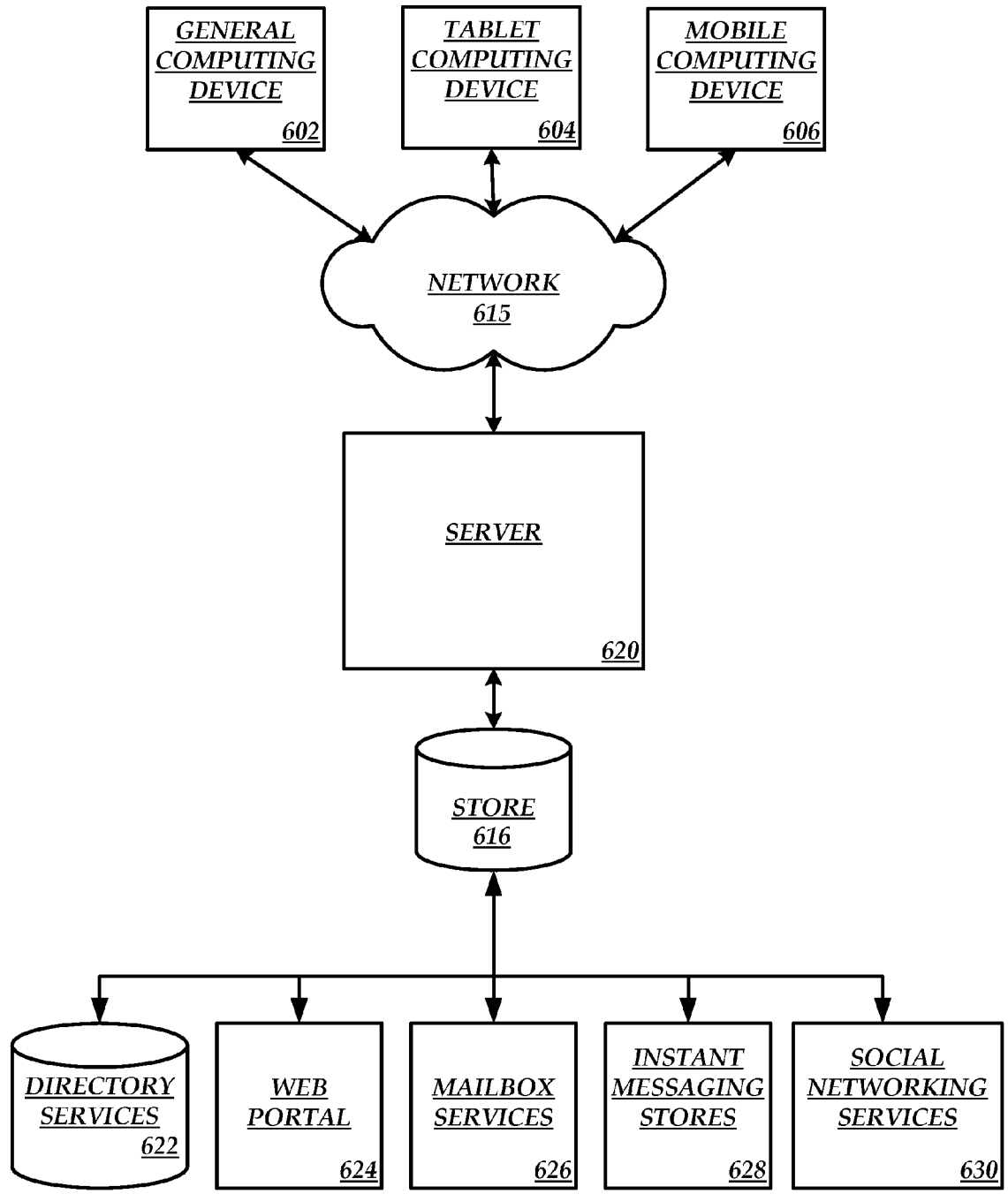
FIG. 6 illustrates one embodiment of the architecture of a system that includes one or more client devices.

FIG. 6 illustrates one embodiment of the architecture of a system that includes one or more client devices. Content, including electronic documents that include text, may be stored in different communication channels or other storage types. For example, various information may be stored using a directory service 622, a web portal 624, a mailbox service 626, an instant messaging store 628, and/or a social networking site 630. As one example, the server 620 may be communicated with over network 615, such as the Internet or other network for example. By way of example, the client computing device may be implemented as a general computing device 602 and embodied in a personal computer, a tablet computing device 604, and/or a mobile computing device 606 (e.g., a smart phone). Any of these clients may use content from the store 616.

Embodiments of the invention, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

It should be appreciated that various embodiments can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
receiving an actuation of a font size control trigger displayed in a ribbon-shaped interface having a set of controls corresponding to a selected tab, wherein the font size control trigger comprises a font size indicator indicating a present font setting;
displaying a font size control interface in response to the actuation of a font size control trigger, wherein the font size control interface is displayed as a popover extending from the ribbon-shaped interface and includes a concurrent display of:
a first incremental control that operates to incrementally increase a font size,
a second incremental control that operates to incrementally decrease the font size,
a direct entry control configured to receive an entered font value, and
a scrollable control configured to receive scrolling inputs associated with a plurality of font sizes displayed as part of the scrollable control, wherein the font sizes displayed with the scrollable control dynamically adjust to reflect changes made to the font size via one or more of the first incremental control, second incremental control, and direct entry control.

2. The method of claim 1, wherein the first and second incremental controls are adjacently disposed on either side of the direct entry control.

3. The method of claim 1, wherein the first and second incremental controls are the same size and the first incremental control displays a minus sign as a decrement target and is disposed on the left side of the direct entry control and the second incremental control displays a plus sign as an increment target and is disposed on the right side of the direct entry control.

4. The method of claim 3, wherein the first and second incremental controls operate in response to single touch inputs to increment the font size by one for each touch.

5. The method of claim 4, wherein the first and second incremental controls operate to increase a speed of incrementing for a prolonged touch operation.

6. The method of claim 1, wherein the scrollable control displays a finite number of font sizes and includes additional selectable font sizes hidden from view.

7. The method of claim 1, further comprising hiding the font size control upon receiving a subsequent user input outside of the font size control.

8. The method of claim 1, wherein the scrollable control displays a finite number of selectable font sizes, wherein each selectable font size of the scrollable control is displayed in a display area that is larger than a display area of each of the first and second incremental controls.

9. The method of claim 1, further comprising changing the font size in response to a user input associated with one or more of the first incremental control, second incremental control, direct entry control, and the scrollable control.

10. The method of claim 1, wherein the font size control interface extends downward from the ribbon-shaped interface.

11. The method of claim 10, wherein the font size control interface is displayed over a portion of a displayed document.

12. A portable computing device comprising:
a processor and memory;
an application including a font size control interface activated via a trigger in a ribbon-shaped interface, wherein the trigger comprises a displayed font size indicator indicating a present font setting, wherein the font size control interface is displayed as an extension of the ribbon-shaped interface includes a concurrent display of: a first incremental control that operates to incrementally increase the font size, a second incremental control that operates to incrementally decrease a font size, a direct entry control disposed between the first and second incremental controls and configured to receive an entered font value, and a scrollable control disposed below the first and second incremental adjustment controls and direct entry control, the scrollable control to display a plurality of font sizes, wherein the font sizes displayed with the scrollable control dynamically adjust to reflect changes made to the font size via one or more of the first incremental control, second incremental control, and direct entry control.

13. The device of claim 12, wherein the first and second incremental adjustment controls are adjacently disposed on either side of the direct entry control.

14. The device of claim 12, wherein the font size control interface simultaneously displays the first incremental control, the second incremental control, the direct entry control, and the scrollable control as part of a popover interface.

15. The device of claim 12, wherein the font size control interface can be dismissed based on further user input.

16. The device of claim 12, wherein the font size control interface comprises a popover interface.

17. The device of claim 12, wherein the first and second incremental controls operate in response to single touch inputs to increment by one for each touch.

18. Computer storage which stores instructions that operate to:

receive a selection of a trigger displayed in a ribbon-shaped interface above a displayed portion of a document, wherein the font size control trigger comprises a font size indicator indicating a present font setting;

in response to receiving the selection of the trigger, display a font size control popover extending from the ribbon-shaped interface, wherein the font size control popover includes a concurrent display of: a first incremental control that operates to incrementally increase a font size, a second incremental control that operates to incrementally decrease the font size, a direct entry control disposed between the first and second incremental controls, and a scrollable control disposed below the first and second incremental controls and direct entry control, the scrollable control to receive scrolling inputs associated with a plurality of selectable font sizes displayed as part of the scrollable control, wherein the font sizes displayed with the scrollable control dynamically adjust to reflect changes made to the font size via one or more of the first incremental control, second incremental control, and direct entry control.

19. The computer storage of claim 18, wherein the instructions operate further to adjust the font size based on use of one or more of the simultaneously displayed controls.

20. The computer storage of claim 18, wherein the font size control interface is displayed over a portion of the document.

* * * * *